(12) United States Patent
Hsu et al.

(10) Patent No.: US 7,647,310 B2
(45) Date of Patent: Jan. 12, 2010

(54) WEB PAGE EDITING SYSTEM WITH DATABASE DRILL-DOWN

(75) Inventors: Wen-Hao Hsu, Taipei (TW); Fu-Bin Peng, Taipei (TW); Chang-Chun Lai, Taipei County (TW); Yi-Chen Hsu, Taipei (TW); Shuang-Fu Han, Taoyuan County (TW)

(73) Assignee: InfoPower Corporation, Taipei (TW)

( * ) Notice: Subject to any disclaimer, the term of this patent is extended or adjusted under 35 U.S.C. 154(b) by 319 days.

(21) Appl. No.: 11/695,615

(22) Filed: Apr. 3, 2007

(65) Prior Publication Data

US 2007/0245224 A1 Oct. 18, 2007

(30) Foreign Application Priority Data

Apr. 7, 2006 (TW) ............................... 95112390 A (51) Int. Cl.
*G06F 17/30* (2006.01)
(52) U.S. Cl. ........................... 707/3; 707/102; 709/218; 715/205
(58) Field of Classification Search .................. 715/205
See application file for complete search history.

(56) References Cited

U.S. PATENT DOCUMENTS

| 5,537,618 | A * | 7/1996 | Boulton et al. ............... 715/745 |
| 5,752,025 | A * | 5/1998 | Shakib et al. ................ 707/102 |
| 5,924,072 | A * | 7/1999 | Havens ........................... 707/1 |
| 6,094,649 | A * | 7/2000 | Bowen et al. ................... 707/3 |
| 6,169,992 | B1 * | 1/2001 | Beall et al. .............. 707/103 R |
| 6,915,293 | B2 * | 7/2005 | Nguyen ........................... 707/3 |
| 7,058,944 | B1 * | 6/2006 | Sponheim et al. ............ 718/100 |
| 2001/0003828 | A1 * | 6/2001 | Peterson et al. ............. 709/219 |
| 2002/0169851 | A1 * | 11/2002 | Weathersby et al. ......... 709/218 |
| 2003/0158872 | A1 * | 8/2003 | Adams ........................ 707/203 |
| 2004/0193591 | A1 * | 9/2004 | Winter ........................... 707/3 |
| 2006/0031404 | A1 * | 2/2006 | Kassab ........................ 709/218 |
| 2009/0024939 | A1 * | 1/2009 | Cudich et al. ................ 715/762 |

FOREIGN PATENT DOCUMENTS

JP 2006024038 A * 1/2006

* cited by examiner

*Primary Examiner*—Shahid A Alam
(74) *Attorney, Agent, or Firm*—Winston Hsu (57) ABSTRACT

A method of establishing a link in a first web page includes establishing a first component in the first web page capable of querying a first data source, establishing a variable named according to a predetermined naming convention, generating an argument to the variable having a field queried in the first data source, establishing a second component in a second web page capable of receiving the variable from the first component, appending the argument to a query statement, and querying a second data source linked to the first data source, and embedding a link to the second web page in the code of the first web page having the variable and the argument.

10 Claims, 6 Drawing Sheets

Fig. 1

| SQL statement | Purpose | Can change actively | Naming rule |
|---|---|---|---|
| Select/from | Display table/field | N | |
| Where | Query condition | Y | <Component> Where |
| Group | Group relationships | Y | <Component> Group |
| Having | Query condition | Y | <Component> Having |
| Order by | Sort field | Y | <Component> Order |

Fields

Data field [Country of origin (Code :C2) ▽]

Subject link

Generate sort links

[Current window ▽]

Data link
● Use the same link for all data
○ Set first N data links

Link location

[Add] [Delete]

Open window

[⇦] [⇨]

△

▽

[OK] [Cancel]

WEB PAGE EDITING SYSTEM WITH DATABASE DRILL-DOWN

BACKGROUND OF THE INVENTION

1. Field of the Invention

The present invention relates to web page editing systems, and more particularly to a web page editing system that can generate web page links for linking to a database to perform data queries and filtering to achieve a data drill-down effect.

2. Description of the Prior Art

In today's information age, databases are used to store and transfer large, complex sets of data. The data is typically stored in a database on a computer system. Currently, many database systems using Structured Query Language (SQL) can be found on the market, and many types of software are available for performing queries against the database systems, such that users who are unfamiliar with SQL commands can still access data in the database systems. Beyond using specific database software, web pages can also link to databases to provide data query functions. Thus, the user can use a typical web browser to connect to, and search, the database, which eliminates the need to install and use specific database software.

In the prior art, a web page editing system for creating web pages that link to databases comprises a web page editing module. A web page designer can utilize a web page editing interface to open a connection with a database module, send authorization information to the database module, and after being authorized, link to a plurality of databases in the database module to read and display data of the databases. The web page designer can select any type of data, and use the editing system to display the data on a web page in table, graph, or other display format according to various settings.

When querying the database, the user often needs a dimension of the queried data to perform a top-down analysis. For example, after obtaining a corporation's revenue reports for all countries, the user may want to look at transactions data (or other data) for one country. This kind of query behavior is called "drill-down." When creating a linked database web page, generating drill-down functions is particularly complicated. First, rules and statements for variables related to transmission of data in the database must be defined. Then, links must be attached dynamically to data during web page data queries. Finally, the web page must be designed to update data after processing dynamically received links. These tasks require a programmer who is familiar with programming languages, SQL, and databases to write program code and the web page. However, most programming or editing environments lack corresponding functions, e.g. rules for defining transmitting and receiving links, that allow establishment, transmission, and reception of links to follow a defined standard, and also lack embedding of program code in the web page that allows a server for the web page to perform a variety of tasks as the server receives arguments from the web page. Simultaneously, when the editor lacks dynamic SQL syntax functions, links cannot be dynamically attached when querying data, and variable links cannot be processed. For example, the database may have a list of countries and various kinds of data corresponding to each country. If the user wants to use a linked database of a first web page to query names of all countries, and after selecting one of the names of the countries, use a second web page to query various other information related to the country, but is unable to use a variable to represent a dynamically changing country name, the first web page will be unable to assign a link immediately to every country name obtained through the query, and the second web page will also be unable to receive dynamically generated country name arguments to query the various other information.

Due to the fact that web page designers must input comprehensive and large amounts of program code and SQL syntax to increase functionality, results depend heavily on the web page designer's programming and SQL ability, and are limited by the editing tools used. Thus, developing web sites with advanced query functions is a very difficult task, causing many linked database web pages to lack drill-down query functions.

SUMMARY OF THE INVENTION

According to the present invention, a method of establishing a link in a first web page comprises establishing a first component in the first web page capable of querying a first data source, establishing a variable named according to a predetermined naming convention, wherein the name of the variable comprises a query function keyword, generating an argument to the variable comprising a field queried in the first data source, establishing a second component in a second web page capable of receiving the variable from the first component, appending the query function keyword and the argument to a predetermined query statement, and utilizing a result of appending the query function keyword and the argument to the predetermined query statement to query a second data source linked to the first data source, and embedding a link to the second web page in the code of the first web page comprising the variable and the argument.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
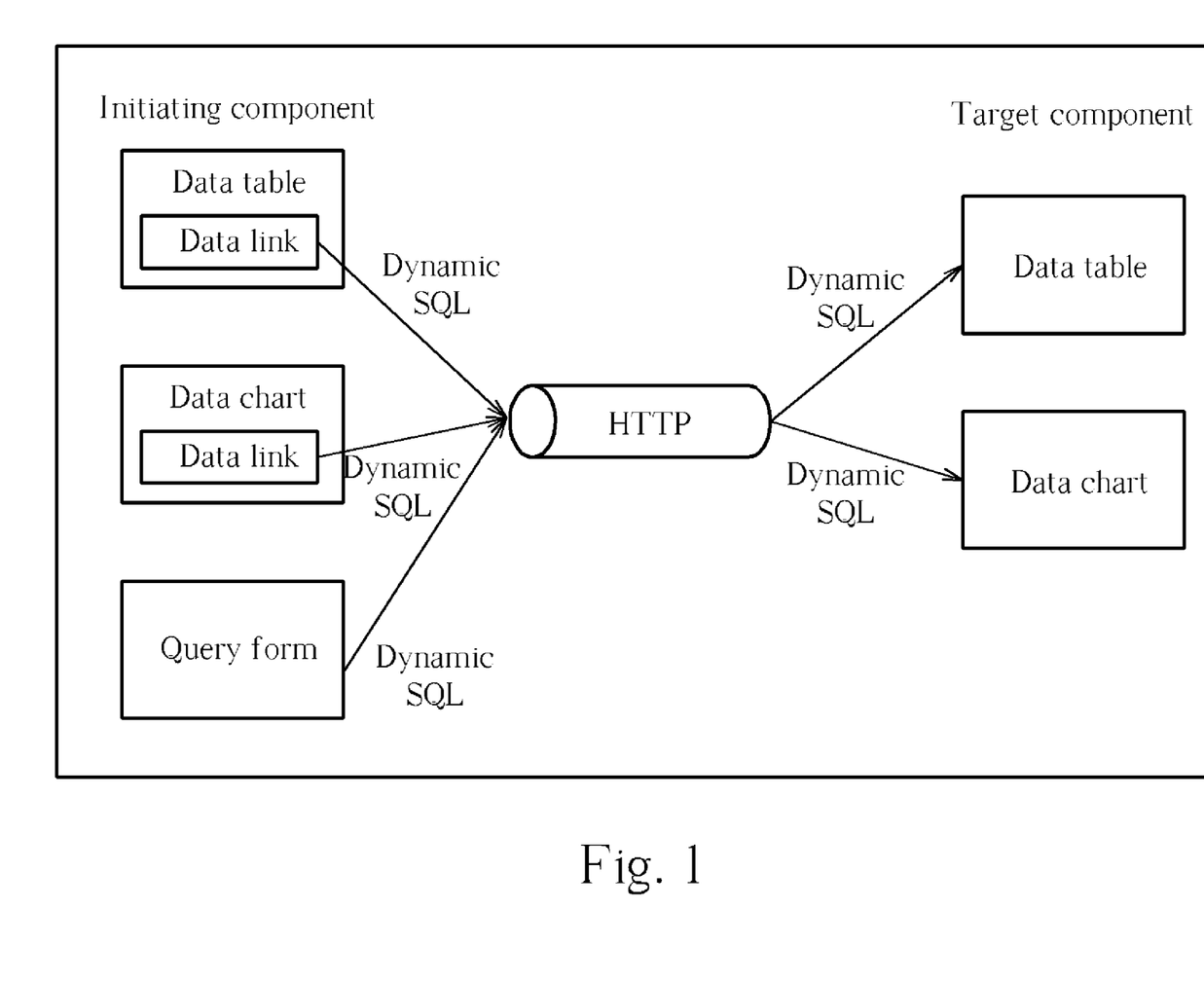
FIG. 1 is a structural diagram of dynamic SQL components and links according to the present invention.

The present invention provides a web page editing system having a database query function for editing and generating data drill-down web pages and dynamic SQL functions. The present invention first provides rules that are well defined and form a basis for editing statements, used for sending, receiving, and processing various links and dynamic SQL. In practice, the editing system generates program code for executing the rules defined by the present invention in a web page. In the following description, "component" indicates a program module in the web page for executing database query functions and displaying results of the query functions. The component can change its behavior and output with different arguments received. Individual web pages can comprise many components. The present invention rules utilize HTTP to send link arguments, as shown in FIG. 1, which is a structural diagram of dynamic SQL components and links. An initiating component and a target component form two ends of each link. When a user of the web page clicks on a field link of the initiating component, the link sends arguments to a server, and the server opens the web page and executes a database query on the target component according to the contents of the link. Then, the server responds with a result of the query on the target component, which is displayed in the web page user's browser.

Figure 2:
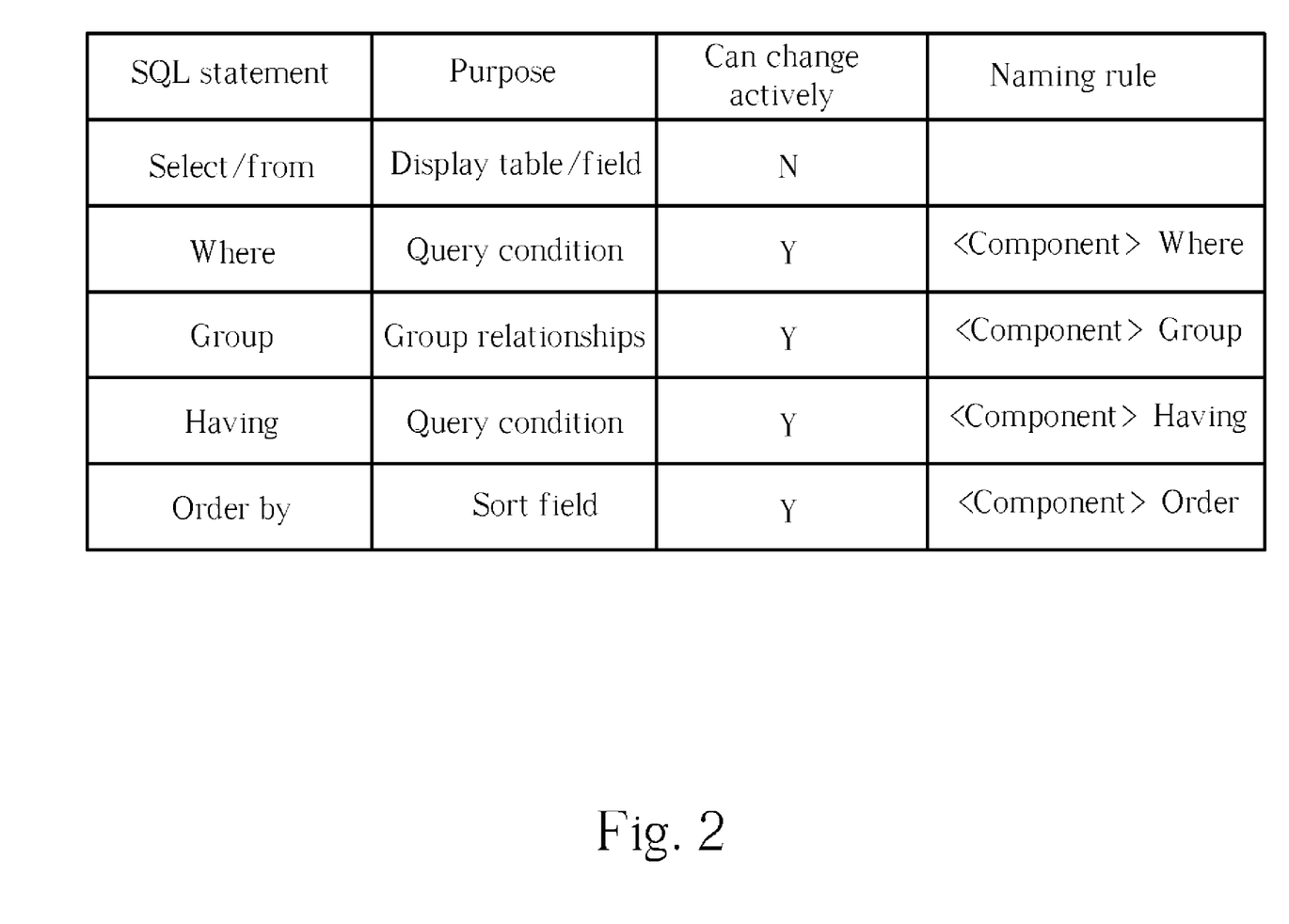
FIG. 2 is a table of dynamic SQL statements as used in the present invention.

The link arguments sent are formed of a statement fragment and query conditions. The statement is a reference dynamic SQL statement and provides a similar function. FIG. 2 shows the present invention reference dynamic SQL statement fragments and corresponding arguments. The dynamic SQL statements comprise SELECT/FROM, WHERE, GROUP, HAVING, and ORDER BY. Other than SELECT/FROM, which involves a security issue, the other statements all have defined naming conventions for use in link arguments. For example, the dynamic SQL statement WHERE can be used to change and set query conditions. To change the query condition of a component named "data," an argument having content such as "dataWhere=<query condition>" could be sent through the link to the data component to change its behavior and the result sent back. The query condition is used to set a query variable of the component, and can be used to indicate a variable of the component as a field for a query in an other component, to indicate that data obtained through the component query should be greater than or less than a value, or even to change sorting methods or perform other query functions.

For example, assume that the initiating component searches a database and lists employee names, and further uses the present invention method to set the employee name field to have a field link. Further, a target component called "USER" has a SQL statement set, such as "SELECT name, birthday, department FROM company", so that the target component will search the database and list the name, birthday, and department data from the company. The link content of the initiating component is set as the argument of the query condition of the target component. For example, when the employee name field "Webber" of the initiating component is selected, the link will send an argument, "UserWhere=name='Webber' AND company='Infopower'". After the target component receives the argument, the following dynamic judgments are made:

1. Because the argument name is "UserWhere", the target component decides to receive the argument; and 2. Because the argument name is "UserWhere", the target component determines that it must add the argument dynamically to the end of the original SQL statement to form, "SELECT name, birthday, department FROM company WHERE name='Webber' AND company='Infopower'".

Thus, when the user selects the name field link for "Webber" in the initiating component, the target component executes the above complete SQL statement, and lists the result of the query in which the name is "Webber" and the company is "Infopower", thereby achieving the dynamic data drill-down effect.

The example described above is for a situation in which the argument content employs the WHERE statement. Thus, the target component dynamically adds the WHERE keyword to the end of the SQL statement on its own, so as to conform with standard SQL syntax, and attaches the argument value received after the WHERE keyword. The argument content could also use other statement keywords, such as GROUP, HAVING, and ORDER BY, so that the target component can perform data comparison, sorting, or other dynamic data drill-down functions. The present invention method inserts program code into web pages and components to identify and receive links, and process their arguments.

An editing system using the present invention method comprises a web page and component editing module for inserting program code to embed the above-described rules in the web page. The web page and component editing module provides a web page and component editing interface for receiving data and variables selected by a user of the editing system for use as web page components. The editing system further comprises a link editing module. When the user would like to add links to other components in the web page, the user can use the web page and component editing interface to start the link editing module. The link editing module provides a link editing interface. The user can utilize the link editing interface to add links to selected fields of each web page and component, and to edit various settings of the links. This function comprises dynamically generating SQL statements according to the user's components/fields selection or function editing process, so as to establish links between the initiating component and one or more target pages and components.

The following is a description of a process by which the user sets up links at the initiating component, and utilizes another component as a target component for receiving the links. Please refer to FIG. 3, which is a flowchart of the user of the present invention editing system setting the links. Initially, in Step 301, the user establishes a component. The user edits data on the web page with the web page and component editing interfaces. The present invention editing system sets the data of the web page as components. The components can take on many forms, including tables, charts, query forms, and other data display formats. A dynamic web page can comprise multiple components. Methods of establishing a component include utilizing the editing system to query the database and select data from the database, utilizing a dynamic SQL statement to query the database or to calculate or read data from an existing component, or using other functions of the editing system to make a data chart or query form. One component typically comprises a variety of data fields having content that comes from querying the database system. The user can select a data type from the database to select the data to be queried by the component. And, beyond using the types provided by the database system, the user can also use the editing system to generate a custom query for new field types, and also name the fields. For example, the user may perform a sum calculation on data obtained through the query, then generate a data field called "Total" in the component after processing. The user could even set up dependencies between multiple components for generating query conditions dynamically through received arguments. When establishing a component, the user can name the component, and the editing system will assign a code to the data fields in the component. Then, in Step 303, when editing links, the editing system will represent the component and fields with the component name and codes. The editing system displays the web page being edited and the configuration of the components, simultaneously providing web page and component design functions, so that the components can be displayed on the web page according to the user's design, including field type, number of fields, component size and position, font, or other design settings. Before setting up the link, the user of the editing system must first complete setup of the component to be linked.

Figure 3:
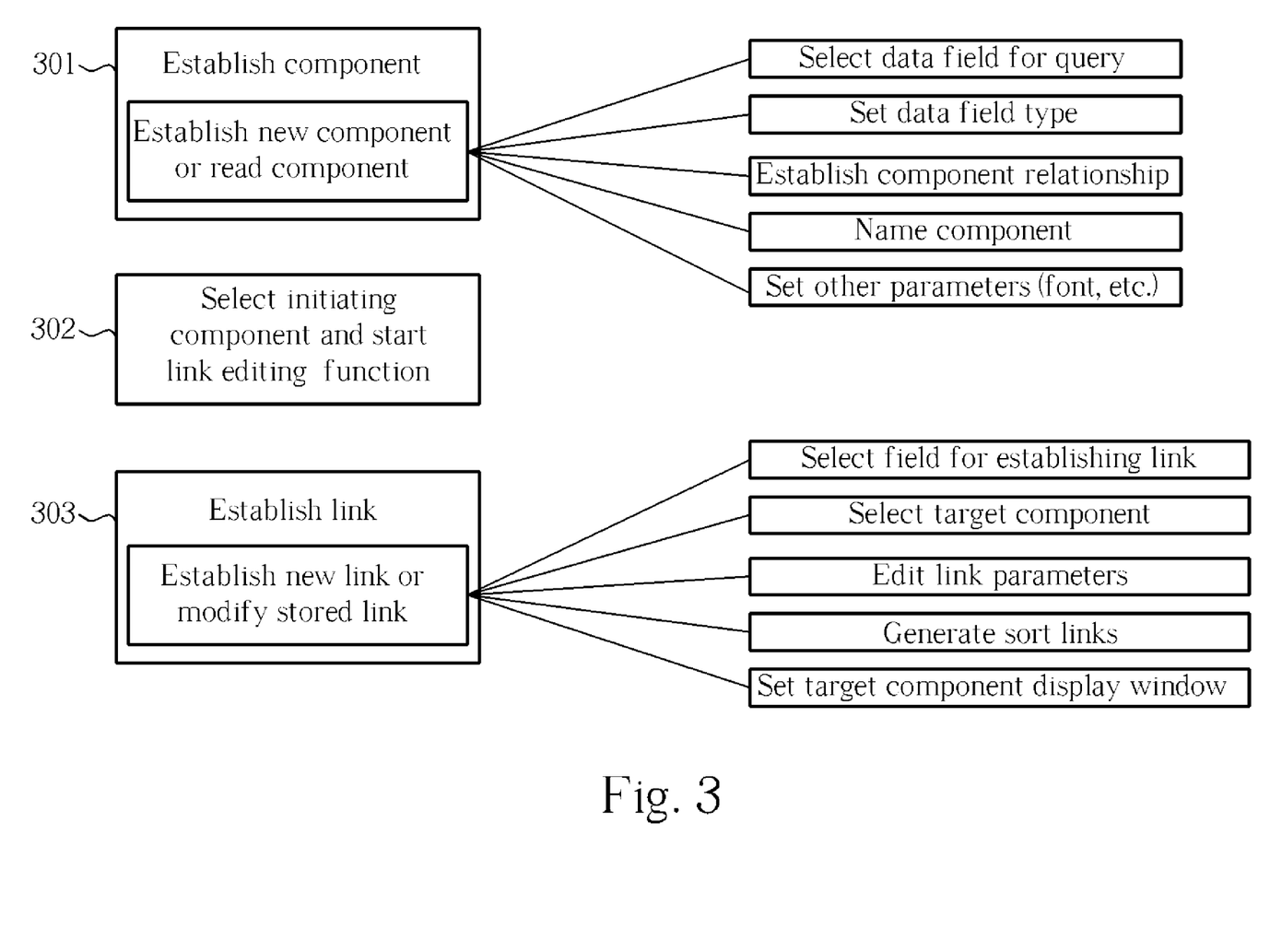
FIG. 3 is a flowchart of a method of generating links according to the present invention.

In Step 302 shown in FIG. 3, when the user wants to add a link to a field of a component, the user must select the component, and start a link settings function, whereby the component becomes the initiating component, and the user moves to the next step in the process.

As shown in FIG. 3, Step 303 is for defining link settings. The link feature sends arguments through HTTP to perform various tasks. In order to set up the link completely, the present invention link editing module provides a data link interface comprising a field region and a hyperlink settings region.

Figure 4:
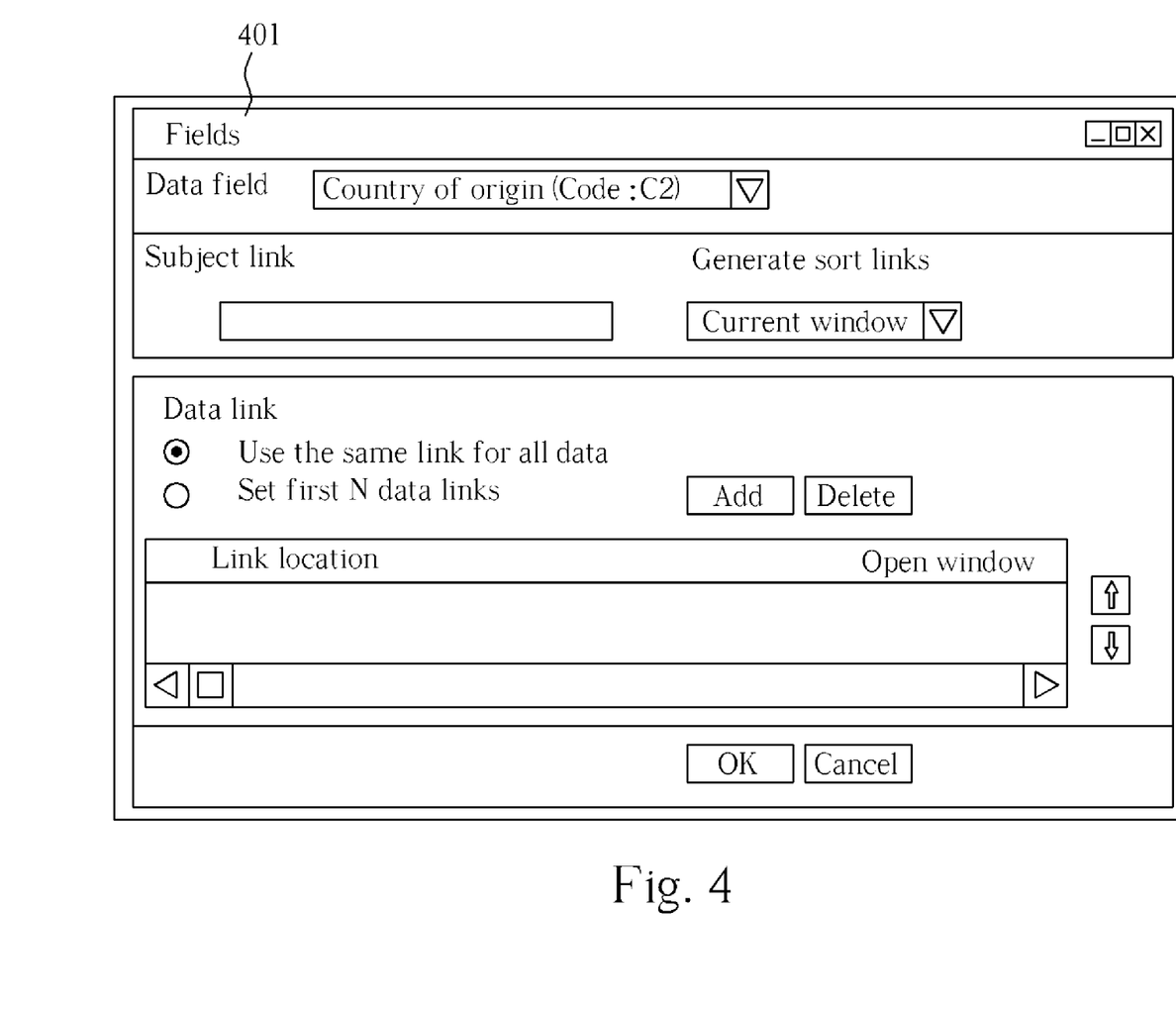
FIG. 4 is a diagram of a field region of a data link interface.
Figure 5:
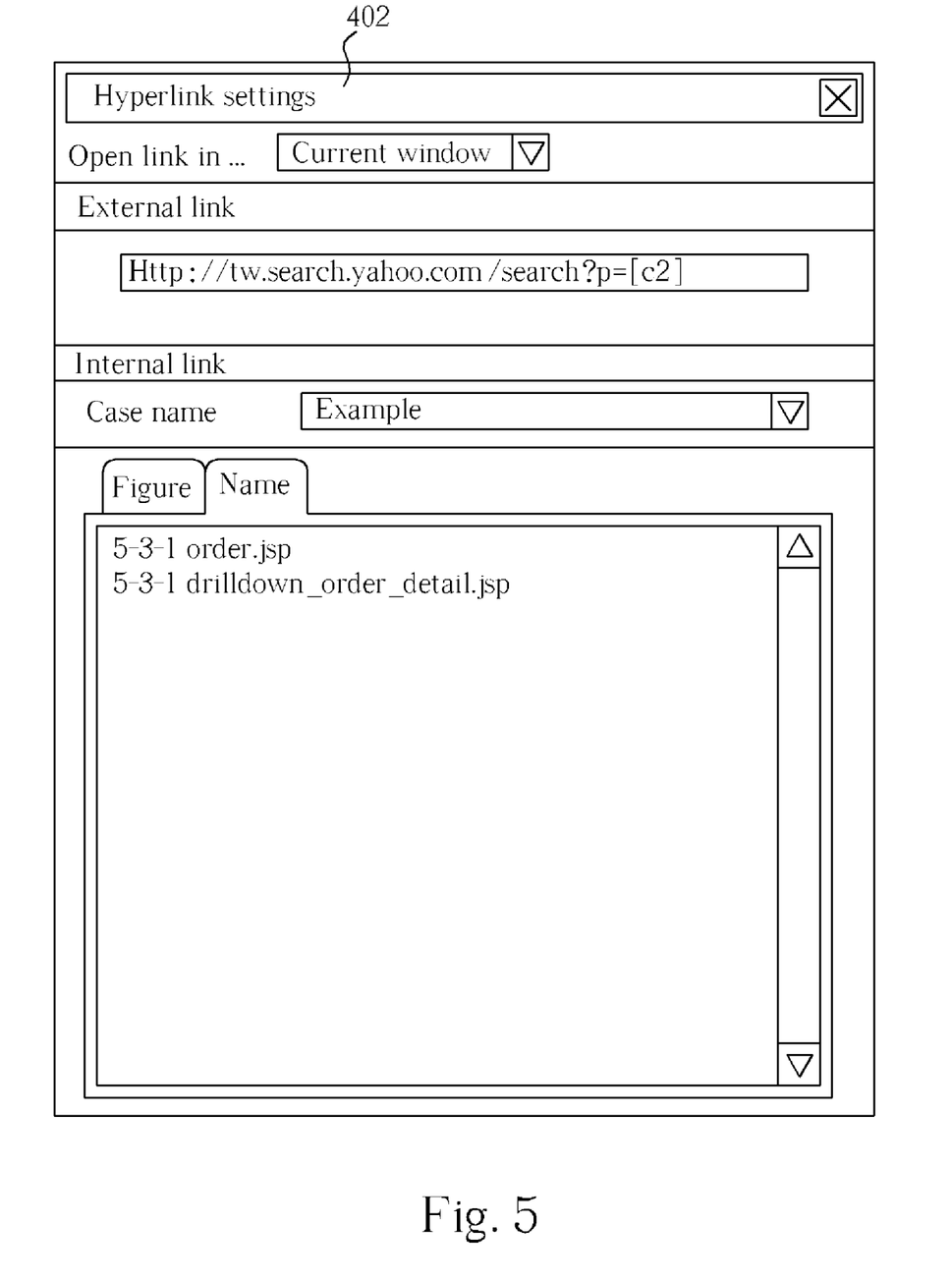
FIG. 5 is a diagram of a hyperlink settings region of the data link interface.

FIGS. 4 and 5 are diagrams of an embodiment of a field region 401 and a hyperlink settings region, respectively, of the data link interface according to the present invention. As shown in FIG. 4, the field region 401 displays various field types and the corresponding code of the initiating component selected in Step 302. The user can choose to add, delete, or edit the linked fields. Selectable fields include data fields or header fields in data tables or data charts, and are not limited to other types of fields in other types of components. The user of the editing system can use the field region 401 to designate which types of fields will have links when the web page is read by a customer. When the customer is selecting one of the links, the customer will send arguments to the web page server through the link, so as to read data, sort data, filter data, display charts, display other web pages, or perform other tasks. Because the link editing module provides dynamic SQL functions, dynamic field links can also be established, so that when links to different data are selected, the web page can send different arguments to the server. Thus, one link editing process can be used to complete linking all data fields of one field type, so that the user need not set up the link for each field one-at-a-time.

As shown in FIG. 5, the hyperlink region 402 displays information about linkable web pages on the server for the user to select, and receives the web page the user selects. Other than displaying the web page group and web page name, as shown in FIG. 5, the web page information displayed can further comprise a thumbnail of the web page to make it easier for the user to select the web page with the target component. After a web page has been selected, the present invention link editing module provides a data link advanced settings interface to give the user an opportunity to edit content of the link. The data link advanced settings interface has a page and component region, and a data link settings region.

Figure 6:
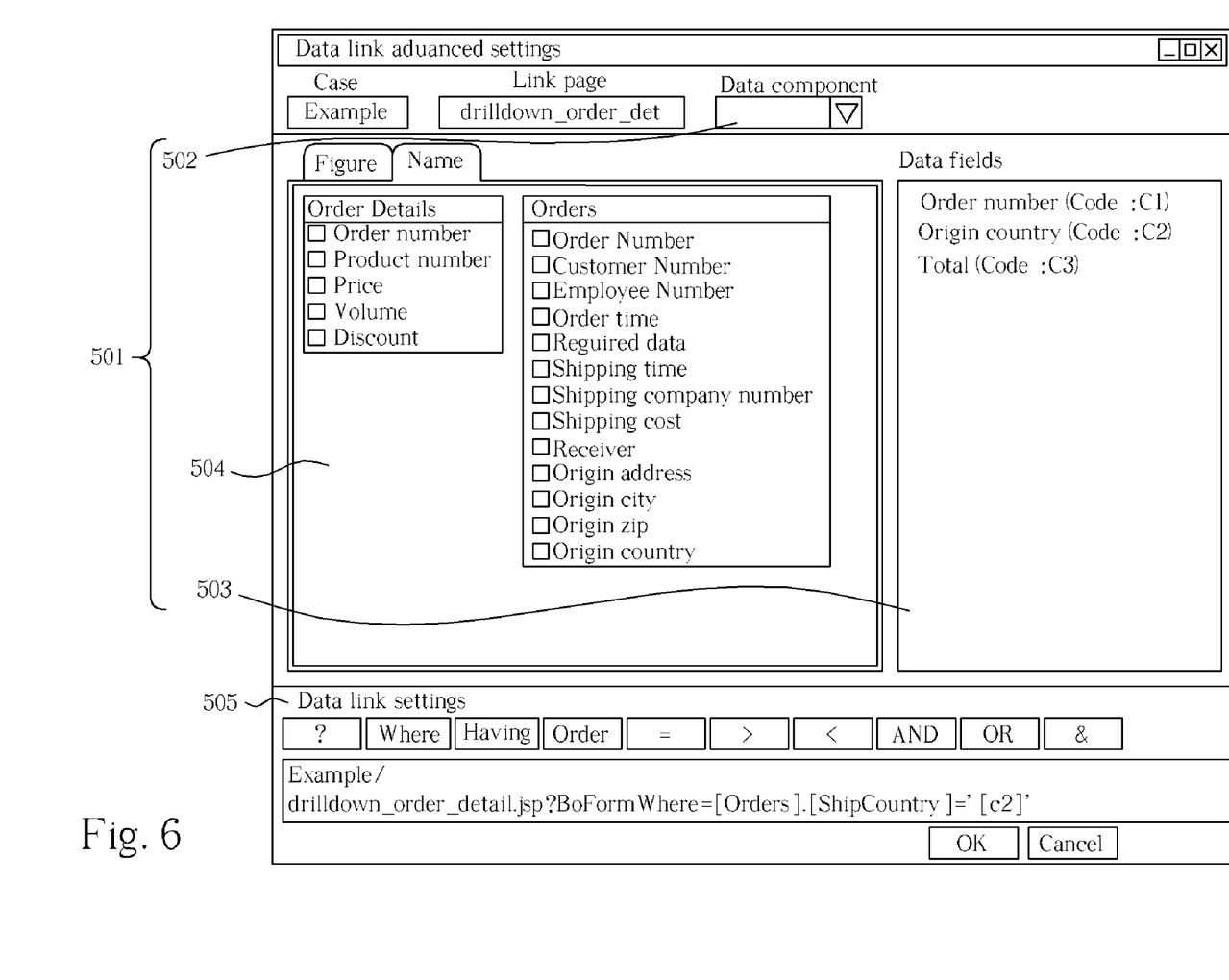
FIG. 6 is a diagram of a data link advanced settings interface.

FIG. 6 is a diagram of an embodiment of the data link advanced settings interface of the present invention. A page and component region 501 provides information about the web page and the components, and points out information about the web page and components currently related to the link. The page and component region 501 further comprises a component list 502, a data field region 503, and a data form 504. The component list 502 lists all of the components of the web page selected as described above for the user to choose as the target component. The target component is a component that the initiating component links to. In the method disclosed by the present invention, the target component receives arguments sent through the link, and dynamically generates a SQL statement to query the database. Thus, the target component can generate different outputs. The data field region 503 displays all field types and codes in the initiating component. The data form 504 displays data field types of the database that are queried by the target component. As shown in FIG. 6, the data form 504 displays two types of data under the headers "Order Details" and "Order", both of which have different data fields. The query objects of the target component comprise a subset of the fields of these two types of data. The fields of the data field region 503 provide argument transmission content. The data form 504, on the other hand, shows data types of the content received by the target component. The query conditions of the target component can be set through these arguments. Thus, after the target component receives the query conditions sent with the arguments, the query objects become a few types of data fields having content that satisfies the query conditions. The data displayed by the data field region 503 and the data form 504 all match up with a function key of the data link settings region 505, to make editing the query conditions in the link arguments simpler.

As shown in FIG. 6, the data link settings region 505 has a link content field, and a plurality of function keys. The link content field displays complete link argument content, and the user can edit the argument content directly in the link content field. The function keys provide dynamic SQL statements, such as WHERE, HAVING, ORDER, or other commonly used operators, such as =, <, >, AND, OR, &, or other commonly used argument symbols. Using the function keys directly inserts corresponding statements or symbols in the link content field, and when the function keys are clicked after the user has selected the component from the page and component region 501, the component name and dynamic SQL statement will both appear in the link content. For example, if a component having a component name of "data" is selected by the user, when the WHERE function key is used, a statement "dataWhere=" will appear in the link content. Subsequently, the data field region 503 and the data form 504 can be used to generate query conditions. By selecting field types, corresponding codes will appear immediately in the link content. Thus, the editing process can mostly be completed through selecting data and function keys displayed in the interface. After completing the link content, because the process for sending and receiving arguments is already defined for the components and links, the initiating component link can output correct arguments with the selections made by the web page user, and the target component can execute tasks correctly based on the arguments received. In summary of the above, by using the data link advanced settings interface to edit the link content, editing time and human error can be reduced.

The completed link is displayed in the field region 401 shown in FIG. 4, and the complete content of the link appears in the link position field. The user can use the data link interface function to add a new link, or delete or modify an existing link. The present invention editing system further comprises a window settings function for choosing where to display the web page after processing the link arguments, including the original window, a new window, a maximum window, a main window, a right-oriented (or left-oriented) window, a top-oriented (or bottom-oriented) window, etc. The user can also specify default link argument settings for all data in specific fields, or other settings. The present invention editing system further comprises a function for generating sort links. The user can use the field region 401 interface shown in FIG. 4 to generate the sort links. The editing system will then generate sort links in the header of each field, so that when the customer is browsing the web page and selects one of the headers, a sort is performed according to the data type of the header selected.

In the embodiment of the present invention, the link statement content is a dynamic SQL statement. By editing the dynamic SQL statement link, the web page editing system can perform display of target data component data, sort by a selected field, performing data filtering based on set conditions, such as displaying data having a value greater than or less than a specified value, or combinations of the above-mentioned functions. As mentioned above, the present invention editing system generates dynamic SQL statements according to selected components and SQL keywords, which lowers the level of SQL ability required of the user.

In the embodiment of the present invention, the link statement content can also comprise HTTP links, and the link object is not limited to the server the web page is located on. Field codes and dynamic links can also be used. When editing links, the argument can also be set as an HTTP link connecting to a web page search engine, and data can be sent as search terms. For example, a link could be set as an HTTP link to a search engine, and the search terms could be set as a field type, such as "Company", of a component. Then, links could be established for all fields of the field type "Company", and the display window could be set as the original window. After setup is completed, all fields of the field type "Company" in the web page will have a link, and after the link is clicked on, the search engine will perform a search using the company name in the field as search terms. The browser window is then updated once the search results page is sent back. Further, the link statement content could also be a link for reading a file, executing a file shortcut, or another type of link. Through the web page, the user can perform all kinds of tasks by clicking on the links.

Those skilled in the art will readily observe that numerous modifications and alterations of the device and method may be made while retaining the teachings of the invention.

What is claimed is:

1. A method of establishing a link in a first web page comprising:
    a first server establishing a first component in the first web page capable of querying a first data source;
    the first server establishing a variable named according to user input and a predetermined naming convention, wherein the name of the variable comprises a query function keyword;
    the first server generating an argument to the variable comprising a field queried in the first data source selected in an editing system by a user;
    a second server establishing a second component in a second web page capable of receiving the variable from the first component, appending the query function keyword and the argument to a predetermined query statement, and utilizing a result of appending the query function keyword and the argument to the predetermined query statement to query a second data source linked to the first data source; and
    the editing system embedding a link to the second web page in the code of the first web page comprising the variable and the argument.

2. The method of claim 1, wherein embedding the link to the second web page in the code of the first web page comprises embedding a hyperlink to the second web page in the code of the first web page.

3. The method of claim 1, wherein establishing the variable named according to the predetermined naming convention comprises establishing a variable comprising a reference to the second component and a query function keyword.

4. The method of claim 3, wherein establishing the variable comprising the reference to the second component and the query function keyword comprises establishing a variable comprising a keyword based on a structured query language (SQL) function keyword.

5. The method of claim 4, wherein establishing the variable comprising the keyword based on the SQL function keyword comprises establishing a variable comprising a keyword based on WHERE, GROUP, HAVING, or ORDER BY SQL function keywords.

6. The method of claim 1, wherein the variable comprising the field queried in the first data source further comprises a condition for filtering a result of querying the second data source.

7. The method of claim 6, wherein the condition for filtering the result of querying the second data source comprises equal to, greater than, less than, or a combination thereof.

8. The method of claim 1, wherein the variable comprising the field queried in the first data source further comprises a condition for sorting a result of querying the second data source.

9. The method of claim 1, wherein the variable comprising the field queried in the first data source further comprises a condition for summing a result of querying the second data source.

10. The method of claim 1, wherein the first web page and the second web page are the same, and the first component and the second component are different components on the same web page.

* * * * *